2,795,889

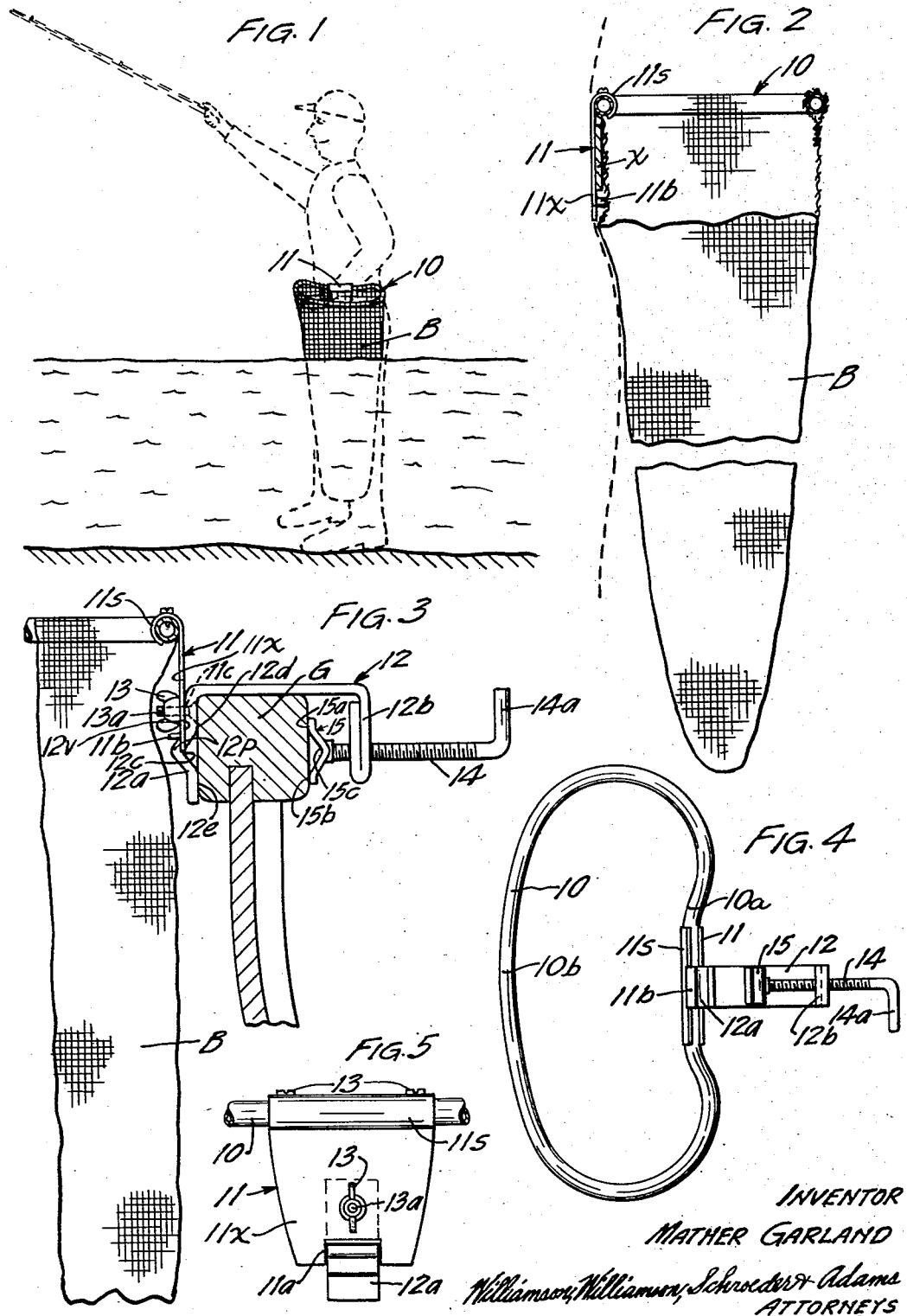

LIVE FISH BAG FOR FISHING BY BOAT OR BY WADING

Mather Garland, Mound, Minn., assignor to Garland Ventilator Corporation, Shakopee, Minn., a corporation of Illinois Application October 1, 1953, Serial No. 383,487

2 Claims. (Cl. 43—55)

This invention relates to live bags or baskets for fishermen whereby game fish when caught may be kept alive in captivity through immersion of at least the lower portion of the bag in a lake or stream.

My present invention relates particularly to a live bag construction which in addition to being readily attachable to the gunwale or vertical wall of a boat, may be also used for stream fishing by wading, with the bag attached and suspended from the belt of the wearer.

It is an object of my invention to provide a highly efficient, compact and very flexible live bag having a frame and attachment facilities which provide for easy and efficient support from the gunwale of a boat as well as providing a secure attachment to the belt of a fisherman with the bag and its mouth disposed most conveniently for use in fishing a stream by wading and with the lower portion of the bag in such use, disposed at the side of the wearer and for some considerable distance below the surface of the stream.

More specifically, it is an object of my invention to provide a live bag of the class described, which may be folded into very small compass for portability and which has a cooperating dual functioning mounting, one portion of which facilitates comfortable attachment to the belt of a stream fisherman while the cooperation of said portion and a quickly detachable clamping bracket provides secure clamping and support of the entire device from the gunwale or vertical wall of a small boat.

These and other objects and advantages of my invention will more fully appear from the following description made in connection with the accompanying drawings wherein like reference characters refer to similar parts throughout the several views and in which:

Fig. 1 illustrates the positioning and use of my live bag where the fishing is accomplished by wading a stream;

Fig. 2 is a vertical section taken in a plane slightly offset from the center of the mounting device and showing my structure as it is releasably locked or retained upon the belt of the wearer;

Fig. 3 is a side elevation showing the complete device as it is attached to the gunwale of a small boat for fishing;

Fig. 4 is a plan view of the entire device with the bag or netting removed, looking upwardly from the bottom thereof; and Fig. 5 is a front elevation showing the locked relationship of the net-supporting plate and forward end of the clamping bracket with the net removed from the frame.

As shown in the drawings, an open topped, flexible bag B constructed preferably from woven plastic netting is supported at its reinforced and hemmed upper edge upon a generally annular rigid frame 10 which may conveniently be constructed of a light metal rod or tubular material. While frame 10 may be of any generally annular shape for compactness and convenience in stream fishing, I prefer to bend an integral metal rod such as aluminum into an annular kidney-shape, as clearly shown in Fig. 4, having an inner concave curve 10a to conform somewhat to the hip of the wearer and having its longitudinal outer edge defined by a convex curve 10b.

I provide a composite metal mounting and support for the bag frame and bag consisting in two cooperating elements to wit, a net-supporting plate or shank 11 having a depending shank 11x and a clamping bracket 12 which are readily connectible when it is desired to use my device for fishing in a boat and which may be readily disconnectible to facilitate the very efficient connection and support of the net frame from the belt and body of a fisherman when he is wading. The net-supporting plate 11 as shown, comprises an integral plate of non-corrosive metal such as aluminum or bronze which may taper slightly in width from its upper to its lower end, the upper marginal portion of this plate being rolled to define a tubular socket 11s in which the terminal portions of the rod or tube member constituting net frame 10 may be accommodated and secured by any suitable means such as a pair of set screws 13. Plate 11 is rectangularly recessed as shown in Fig. 3 and Fig. 5 from its lower end upwardly to provide an enlarged, squared retaining notch 11a for accommodating and non-rotatively engaging the forward depending end of the clamping bracket 12. In forming recess 11a, stock of the plate material 11 is slit above the upper edge of the recess forming a short lip or transversely extending lug (see Figs. 2, 3 and 5) 11b which is curvedly bent outwardly to provide a lock-retainer for underlying the lower edge of a man's trouser belt. Plate 11 is medially drilled to afford a small bore 11c for accommodating the bolt 13a of a wing nut structure 13 thereby detachably connecting the plate with the forward depending arm 12a of the clamping bracket.

Clamping bracket 12 as shown, comprises an integral inverted U-shaped member, preferably constructed from a heavy strap of non-corrosive metal such as aluminum, having an outer depending arm 12a and an inner depending arm 12b widely spaced from said first arm. One of said arms, preferably 12a, is peculiarly bent or die-formed to constitute a highly efficient clamping jaw. The medial portion of arm 12a is angularly bent as shown in Fig. 3, to provide a central V-shaped gripping portion 12c offset from the adjoining vertical clamping surfaces 12d and 12e, said surfaces being aligned and flatened for engaging the outer edges of the gunwale of a boat or of the rear or other vertical wall of a boat. The inner depending arm 12b is preferably doubled upon itself as shown in Fig. 3 and the superimposed plies of material are centrally tapped to threadedly receive an elongated clamp adjustment screw 14 having a turned handle 14a at the outer end thereof. A clamping plate 15 is rotatively connected with the inner extremity of screw 14 within the confines of the bracket and the shape of clamping member 15 is identical and oppositely disposed to the clamping jaw formed upon arm 12a having the adjoining flat vertical clamping surfaces 15a and 15b and the outwardly offset V-shaped surface 15c opposed to the V-clamping portion 12c of the first arm. To rotatively attach the inner end of clamp screw 14 to clamping member 15, the inner end of screw 14 may be diminished in diameter affording a shoulder for engagement against the back of clamping member 15 and the extremity of the screw 14 may be swedged against the inner face of the clamping element for retention thereon. The bolt 13a of the wing nut structure for detachably securing clamping bracket 12 to net-supporting plate 11 has its head countersunk in the inner surface of bracket arm 12a and the two components of the mounting may be readily detached by releasing the wing nut and separating members 11 and 12. In connection with the attachment of the bag to the clamping bracket 12 it will be noted that the outer arm 12a of the clamping bracket has an upper exterior vertical attachment surface 12v and an exterior projecting portion 12p formed below said supporting surface.

The specific construction of the flexible bag or net B which I employ is thought to be novel and to provide new and improved results over any net or mesh construction previously used for similar or analogous purposes. I prefer to construct my bag B from highly flexible, non-corrosive and substantially indestructible plastic netting of preferably relatively fine mesh.

In Figs. 1 and 2 my device is illustrated as it is mounted for use by a fisherman wading a stream or shore. The clamping bracket 12 for such use is removed from the net-supporting plate 11 by detachment of the wing nut structure 13 and the plate 11 is then easily thrust beneath the belt at one side or the other of the wearer until the retaining lip 11b underlies the belt X as shown in Fig. 2. The weight of the mounting frame 10 and the bag is then supported partially from one hip of the wearer and of course partially from the belt itself. Retaining lip 11b prevents displacement or disengagement of the mounting from the belt in the event the frame is jarred by an obstruction or movement of the wearer.

The compact structure of the net-supporting plate, kidney shaped frame and bag is such that it will not inconvenience the wearer in wading a stream while nevertheless affording a relatively large and convenient opening at the top of the bag for introduction of a fish.

In Fig. 3 my device is shown as operatively attached for fishing to the gunwale G of a common type of wooden boat. The clamping bracket 12 is of course utilized in this operation secured to the net-support 11 by wing nut structure 13 and non-rotatively keyed to plate 11 through engagement of the outer arm 12a of the bracket by the confining squared recess or notch 11a in the lower end of plate 11. The bag B in such position extends downwardly close to the boat with the lower portion thereof immersed in the water. The structure of clamping bracket 12 and the cooperating jaws 12a and 15 enable the device to be readily attached to gunwales as well as rear seat structures of boats wherein considerable variation in the thickness of the supporting member is present. Furthermore, the peculiar shape of the cooperating and opposed faces of jaws 12a and 15 enable various cross sectional shapes of gunwales such as beaded round grooves and squared grooves on metal boats which oftentimes have their longitudinal surfaces angled with respect to the horizontal.

From the foregoing description, it will be seen that I have provided an efficient, compact and economical live bag with attachment facilities to provide for rigid and efficient support from the gunwales of various boats as well as to provide a secure attachment to the belt of a fisherman wading a stream or lake shore.

It will of course be understood that various changes may be made in the form, details, arrangement and proportions of the parts without departing from the scope of my invention.

What I claim is:

1. A live fish bag and dual-function mounting therefor having in combination a clamping bracket comprising an inverted U-shaped member providing a pair of widely spaced, depending arms, one of said arms forming a clamping jaw and the other of said arms being tapped to receive a clamping screw opposed to said first arm, a clamping screw threadedly received in said second arm, the first arm of said member having an external, substantially vertical attachment surface provided some distance below the top thereof with an intermediate projecting portion, said mounting further including a bag-supporting plate having a depending, vertical attachment shank for positioning against said attachment surface and having a substantially horizontal frame-securing socket at the upper end thereof, a generally annular, substantially rigid, bag-supporting frame secured in transverse relation to said plate within said socket, a flexible, elongated bag supported from said frame outwardly of said plate and having an upper end distended by said frame, said shank having a medial aperture therein, and an attachment element carried intermediately of the attachment surface of said first arm for projection through the apertured portion of said shank and having means for clamping attachment of said shank against said vertical surface, said shank when detached from said clamping bracket, being shaped to be slipped beneath and against the belt of a fisherman for supporting the bag therefrom and the shank having a notched lower end conforming to the shape of said projecting portion on the vertical attachment surface of said first mentioned arm to straddle the same and lock said frame and shank against relative oscillation.

2. A live fish bag and dual-function mounting therefor comprising a clamping bracket open at its lower end for receiving and rigidly clamping the gunwale of a boat, said clamping bracket having an outer, substantially vertically disposed attachment surface, said mounting further comprising a bag-supporting plate having a depending, vertical attachment shank for positioning snugly against said attachment surface and having a substantially horizontal frame-securing means at the upper end thereof, a generally annular, substantially rigid, bag-supporting frame secured to the upper end of said plate, and a flexible, elongated bag supported from said frame outwardly of said plate and having an open, upper end distended by said frame, said plate and said vertical attachment surface having cooperating means for readily and non-rotatably connecting said plate and bracket together in rigid fashion and to prevent relative oscillation thereof with said plate disposed flush against said attachment surface, and said plate being readily detachable through said means and having its shank of a length and of a shape to be slipped beneath the trouser belt of a fisherman and to lie comfortably against the fisherman's body to support the bag in operative position, and said plate having a transversely extending lug adapted to underlie the lower edge of the trouser belt.

References Cited in the file of this patent

UNITED STATES PATENTS

| | | |
|---|---|---|
| 746,188 | Sonsthagen | Dec. 8, 1903 |
| 760,048 | Wilson | May 17, 1904 |
| 803,160 | Franklin | Oct. 31, 1905 |
| 931,437 | Larson | Aug. 17, 1909 |
| 1,113,590 | Williamson | Oct. 13, 1914 |
| 2,367,588 | Kruse | Jan. 16, 1945 |
| 2,487,645 | Gershon | Nov. 8, 1949 |
| 2,560,381 | Babington | July 10, 1951 |
| 2,564,513 | Terwilliger | Aug. 14, 1951 |
| 2,697,296 | Steele | Dec. 21, 1954 |